United States Patent
Payette et al.

(10) Patent No.: US 7,730,113 B1
(45) Date of Patent: Jun. 1, 2010

(54) NETWORK-BASED SYSTEM AND METHOD FOR ACCESSING AND PROCESSING EMAILS AND OTHER ELECTRONIC LEGAL DOCUMENTS THAT MAY INCLUDE DUPLICATE INFORMATION

(75) Inventors: Vincent Payette, Seattle, WA (US); Richard Roger Desmarais, Fall City, WA (US); James Marik Price, Seattle, WA (US); Michael C. Weaver, Redmond, WA (US); Richard J. Corbett, Seattle, WA (US); Barton W. Bodell, Chicago, IL (US); William P. Pernsteiner, Kent, WA (US)

(73) Assignee: Applied Discovery, Inc., Bellevue, WA (US)

( * ) Notice: Subject to any disclaimer, the term of this patent is extended or adjusted under 35 U.S.C. 154(b) by 320 days.

(21) Appl. No.: 11/229,342

(22) Filed: Sep. 16, 2005

Related U.S. Application Data

(63) Continuation-in-part of application No. 09/520,264, filed on Mar. 7, 2000.

(51) Int. Cl.
G06F 12/00 (2006.01)
G06F 17/30 (2006.01)
(52) U.S. Cl. .................. 707/821; 707/827; 709/224; 709/225
(58) Field of Classification Search .............. 707/10
See application file for complete search history.

(56) References Cited

U.S. PATENT DOCUMENTS

| | | | |
|---|---|---|---|
| 5,553,281 A | 9/1996 | Brown et al. | 395/600 |
| 5,581,682 A | 12/1996 | Anderson et al. | |
| 5,778,395 A * | 7/1998 | Whiting et al. | 707/204 |
| 5,813,009 A | 9/1998 | Johnson et al. | |
| 5,903,646 A | 5/1999 | Rackman | |
| 5,903,892 A | 5/1999 | Hoffert et al. | 707/10 |

(Continued)

OTHER PUBLICATIONS

U.S. Appl. No. 09/520,264, filed Mar. 7, 2000, entitled: "Network-Based System and Method for Accessing and Processing Legal Documents," inventor: Weaver et al.

(Continued)

*Primary Examiner*—Mohammad Ali
*Assistant Examiner*—Angelica Ruiz
(74) *Attorney, Agent, or Firm*—Black Lowe & Graham PLLC

(57) ABSTRACT

A network-based system and method processes and analyzes email messages that have been communicated by parties involved in a legal proceeding. The email messages (or other electronic files) of the parties are delivered to a plurality of server units: metadata of the email messages (such as conversational thread information, directory path information, and other properties information) are directed a first server unit, contents of the email messages are directed to a second server unit, and read-only copies of the email messages are provided in a third server unit. If the email messages (or other electronic files) contain duplicate information, the duplicative email message is linked to an email message that has already been delivered to the server units. Once in the server units, users (such as legal professionals) at terminals on a network communicatively coupled to the server units can formulate and direct queries to the server unit(s) to review copies of the email messages (or other electronic files) that are responsive to the queries.

26 Claims, 8 Drawing Sheets

U.S. PATENT DOCUMENTS

| | | | |
|---|---|---|---|
| 5,940,800 A * | 8/1999 | Bennett et al. | 705/1 |
| 6,021,202 A | 2/2000 | Anderson et al. | |
| 6,023,510 A | 2/2000 | Epstein | |
| 6,108,711 A | 8/2000 | Beck et al. | 709/242 |
| 6,138,119 A | 10/2000 | Hall et al. | 707/9 |
| 6,138,139 A | 10/2000 | Beck et al. | 709/202 |
| 6,167,395 A | 12/2000 | Beck et al. | 707/3 |
| 6,170,011 B1 | 1/2001 | Beck et al. | 709/224 |
| 6,212,178 B1 | 4/2001 | Beck et al. | 370/352 |
| 6,230,197 B1 | 5/2001 | Beck et al. | 709/223 |
| 6,282,549 B1 | 8/2001 | Hoffert et al. | 707/104 |
| 6,330,572 B1 | 12/2001 | Sitka | 707/205 |
| 6,332,154 B2 | 12/2001 | Beck et al. | 709/204 |
| 6,353,823 B1 | 3/2002 | Kumar | 707/3 |
| 6,370,508 B2 | 4/2002 | Beck et al. | 705/1 |
| 6,374,260 B1 | 4/2002 | Hoffert et al. | 707/104.1 |
| 6,381,640 B1 | 4/2002 | Beck et al. | 709/223 |
| 6,532,459 B1 | 3/2003 | Berson | |
| 6,542,912 B2 | 4/2003 | Meltzer et al. | |
| 6,738,760 B1 | 5/2004 | Krachman | |
| 6,775,372 B1 | 8/2004 | Henits | |
| 6,795,835 B2 | 9/2004 | Ricart et al. | |
| 6,889,205 B1 | 5/2005 | Lamm | |
| 7,107,290 B2 | 9/2006 | Davis et al. | |
| 7,130,858 B2 | 10/2006 | Ciaramitaro et al. | |
| 2004/0024775 A1 | 2/2004 | Kemp | |
| 2004/0158731 A1* | 8/2004 | Narin et al. | 713/200 |
| 2004/0260876 A1 | 12/2004 | Singh et al. | |
| 2005/0050054 A1* | 3/2005 | Clark et al. | 707/100 |
| 2005/0066190 A1* | 3/2005 | Martin | 713/200 |
| 2005/0138541 A1* | 6/2005 | Euchner et al. | 715/512 |
| 2005/0166046 A1 | 7/2005 | Bellovin et al. | |
| 2006/0218149 A1 | 9/2006 | Patrick | |
| 2006/0277220 A1 | 12/2006 | Patrick et al. | |

OTHER PUBLICATIONS

U.S. Appl. No. 10/452,810, filed May 30, 2003, entitled: "Software-Based Tools to Facilitate On-Line Processing of Electronic Files, Including a Tool for Electronic Redaction," inventor: Sanders et al.

O'Shea, Philip J. et al., "European Law Databases: an Experiment in Retrieval," Computing Laboratory, University of Kent, Canterbury, 1997 IEEE, pp. 227-232.

* cited by examiner

FILE   EDIT   FAVORITES   TOOLS   HELP
BACK | FORWARD | RELOAD | HOME | SEARCH | PRINT | SECURITY | STOP
LOCATION:
CASELIST | SUMMARY | EXIT ← 442
USER : JOSEPH K.
PARTY : ABC CORP.
CASE : ABC CORP. V. XYZ CORP

SOURCE | DATE | BATES # | COLLECTION ← 512

SEARCH BY SOURCE:

| SOURCE | TOTAL | RESPONSIVE | NOT RESPONSIVE | HOT | WITNESS-PREP | PRIVILEGED | NOT REVIEWED | REVIEWED |
|---|---|---|---|---|---|---|---|---|
| STEVE B. | 14,323 | 23 | 14,300 | 5 | 0 | 0 | 0 | 14,323 |
| JAMES W. | 323 | 323 | 0 | 2 | 323 | 0 | 0 | 323 |
| DONALD M. | 3,334 | 47 | 3,287 | 1 | 0 | 0 | 0 | 3,334 |
| MICHAEL W. | 10,332 | 6 | 10,326 | 4 | 0 | 0 | 9,476 | 856 |
| BILL P. | 18,988 | 162 | 18,726 | 23 | 0 | 0 | 11,234 | 7,754 |
| RICHARD L. | 5,611 | 18 | 5,593 | 3 | 0 | 0 | 2,883 | 2,728 |
| JACQUE S. | 12,119 | 5 | 12,114 | 1 | 0 | 0 | 6,376 | 5,743 |
| TRISH M. | 5,423 | 85 | 5,338 | 31 | 0 | 0 | 3,003 | 2,420 |
| TRACEY K. | 7,966 | 76 | 7,890 | 27 | 0 | 0 | 980 | 6,986 |
| GEORGE R. | 3,209 | 52 | 3,157 | 19 | 0 | 0 | 3,209 | 0 |
| KENNETH C. | 2,455 | 102 | 2,353 | 18 | 0 | 0 | 0 | 2,455 |
| TOTALS | 84,083 | 899 | 83,084 | 134 | 323 | 0 | 37,161 | 46,922 |

FIND | ☐ BOOLEAN | ORDER BY ▶

NETWORK-BASED SYSTEM AND METHOD FOR ACCESSING AND PROCESSING EMAILS AND OTHER ELECTRONIC LEGAL DOCUMENTS THAT MAY INCLUDE DUPLICATE INFORMATION

CROSS-REFERENCE TO RELATED APPLICATION

This application is a continuation-in-part of co-pending U.S. patent application Ser. No. 09/520,264 entitled "NETWORK-BASED SYSTEM AND METHOD FOR ACCESSING AND PROCESSING LEGAL DOCUMENTS," filed Mar. 7, 2000, assigned to the same assignee as the present application, and which is incorporated herein by reference in its entirety.

TECHNICAL FIELD

The present invention generally relates to the communication of information over a network, and in particular, relates to the accessing and processing of legal documents via a network, such as the Internet.

BACKGROUND INFORMATION

The legal profession is a profession that requires the review of voluminous amounts of documentation by attorneys. For example, during a document-intensive litigation process known as "discovery," one party (e.g., a "requesting party") frequently requests another party (e.g., a "responding party") to produce documents. The requesting party attempts to build its case by reviewing the requested documents and trying to locate highly significant individual documents (sometimes referred to as "hot documents") that contain text or other information of an incriminating nature.

Document review is an extremely laborious and time-intensive activity. Documents first need to be requested by the requesting party and then produced by the responding party. Litigation strategies dictate that the requesting party try to craft its discovery requests such that the responding party is obligated to produce documents falling within the scope of the requests. Frequently, especially in large litigation cases, discovery requests are drafted very broadly, resulting in the production of thousands of pages of documents, of which only a few pages may be responsive or relevant, if any at all.

The sheer volume of produced documents requires hundreds of hours of attorney and paralegal time to index (e.g., identify and sort each page by a numbering system that uses "Bates numbers") and to review the documents. Frequently, due to the expense of photocopying, only a single set of copies of the produced documents is available to the requesting party, and copies are only made of hot documents when they are located. As such, document review is often characterized by logistic and storage problems, with a group of legal professionals reviewing the produced documents, page by page, in a single room where everyone in the group can have access to the documents. Whenever a hot document is located, that document is typically photocopied or marked (e.g., manually "highlighted" with a highlighter pen, tabbed with a marker, or otherwise identified using manual techniques), and then manually indexed or referenced for later identification and use.

Documents are often produced to the requesting party in random boxes or stacks of pages, and there is virtually no means for efficiently sorting through the stacks and identifying hot documents. That is, other than manually reading each page line by line, it is virtually impossible to sort, organize, or search through the stacks of pages based on criteria such as date, author, recipient, subject matter, etc. Simply stated, document review is a time-consuming and expensive manual process.

With the increased use of network communications in recent years, such as the use of email via the Internet or via a company's internal network, email and other electronic documents are gaining the attention of legal professionals as a rich source of discoverable information. Email is rapidly displacing traditional documents (e.g., letters, contracts, memos, faxes, etc.) as a primary communication medium for business and personal correspondence. Because individuals are more inclined to communicate informally via email, email often contains crucial evidence and is exchanged at a higher rate than traditional documents. Indeed, during the well-publicized case of *United States v. Microsoft Corporation*, Civil Action No. 98-1233 (TPJ) (D.D.C. Nov. 5, 1999), email correspondence reviewed during the course of discovery was significant in building the United States governments' case against Microsoft. Such cases are becoming more common, where hundreds of thousands of email messages may be involved during litigation.

Although cases such as these are often viewed as "high tech" cases because the subject matter of discovery (e.g., emails or other electronic documents) involves electronic media rather the information printed on paper, these cases are nevertheless constrained to traditional discovery methods. The electronic email documents are downloaded and printed on paper (e.g., "hardcopies"), and then reviewed using the same types of manual reviewing and indexing procedures as used for traditional paper-printed documents. That is, the process involves meticulously analyzing each hardcopy document for specific evidence; indexing/recording which documents have been read, which contain evidence, etc.; and collecting the necessary evidence to develop a legal strategy.

There is virtually no means to control the timing of the discovery critical documents. The pivotal evidence might be discovered at any point during the process of reviewing hardcopy emails, which leaves legal teams with an incomplete picture of the evidence upon which to base their strategy. As is common, the focus or strategy of the litigation may change repeatedly during discovery. Thus, previously reviewed documents that were initially dismissed as irrelevant may need to be repeatedly reviewed. Often, the relevancy of individual documents is difficult to ascertain unless viewed in context along with a large body of documents. Obviously, these problems are aggravated when using traditional manual methods for processing paper documents.

Printing email from its native electronic format into a hardcopy results in the destruction of useful characteristics of email, even if hardcopies are scanned into an imaging database. For example, attachments and nested documents become detached and disassociated from their corresponding email messages. Metadata (e.g., date/time stamps, author identification, attachment data, tracking IDs, headers, etc.) are lost when email is printed.

Conversation threads revealing the contextual relationships between messages are also lost. For example, a response to an email message asking whether or not someone intended to commit an illegal act might be a one-word message simply stating "yes." This reply could be a pivotal in a lawsuit, but if it became disconnected from the email containing the question (as would happen if the email message were printed), the reply would be rendered utterly meaningless. This problem becomes worst if there are multiple cc's, replies, forwards associated with a voluminous number of hardcopy emails.

The sheer volume of email hardcopies, coupled with the lack of threading (or other easily identifiable contextual mechanisms), can easily overwhelm readers who, despite their efforts and attention, are nevertheless apt to make mistakes or to miss critical information. Thousands of emails must be read per day, and the emails are often a bewildering combination of disconnected questions and answers, copies of the same message, and detached attachments.

Accordingly, there is a need to improve the manner in which legal documents are made available for review and processing by legal professionals.

BRIEF SUMMARY OF THE INVENTION

According to one aspect, a method in a network is provided to process third-party electronic communications for legal purposes. The method includes directing metadata associated with the electronic communications to a first server unit, directing content of the electronic communications to a second server unit, and providing read-only copies of the electronic communications in a third server unit. The method determines whether any of the electronic communications have duplicative information. Electronic communications having duplicative information are processed differently than other electronic communications. The method applies a query for electronic communications having a specified characteristic and for a legal purpose to any of the server units to determine a set of electronic communications having the specified characteristic.

BRIEF DESCRIPTION OF THE SEVERAL VIEWS OF THE DRAWINGS

Non-limiting and non-exhaustive embodiments of the present invention will be described in the following figures, wherein like reference numerals refer to like parts throughout the various views unless otherwise specified.

FIG. 5 is screenshot of a user interface according to an embodiment of the invention showing processing summary information for legal documents.

Figure 2:
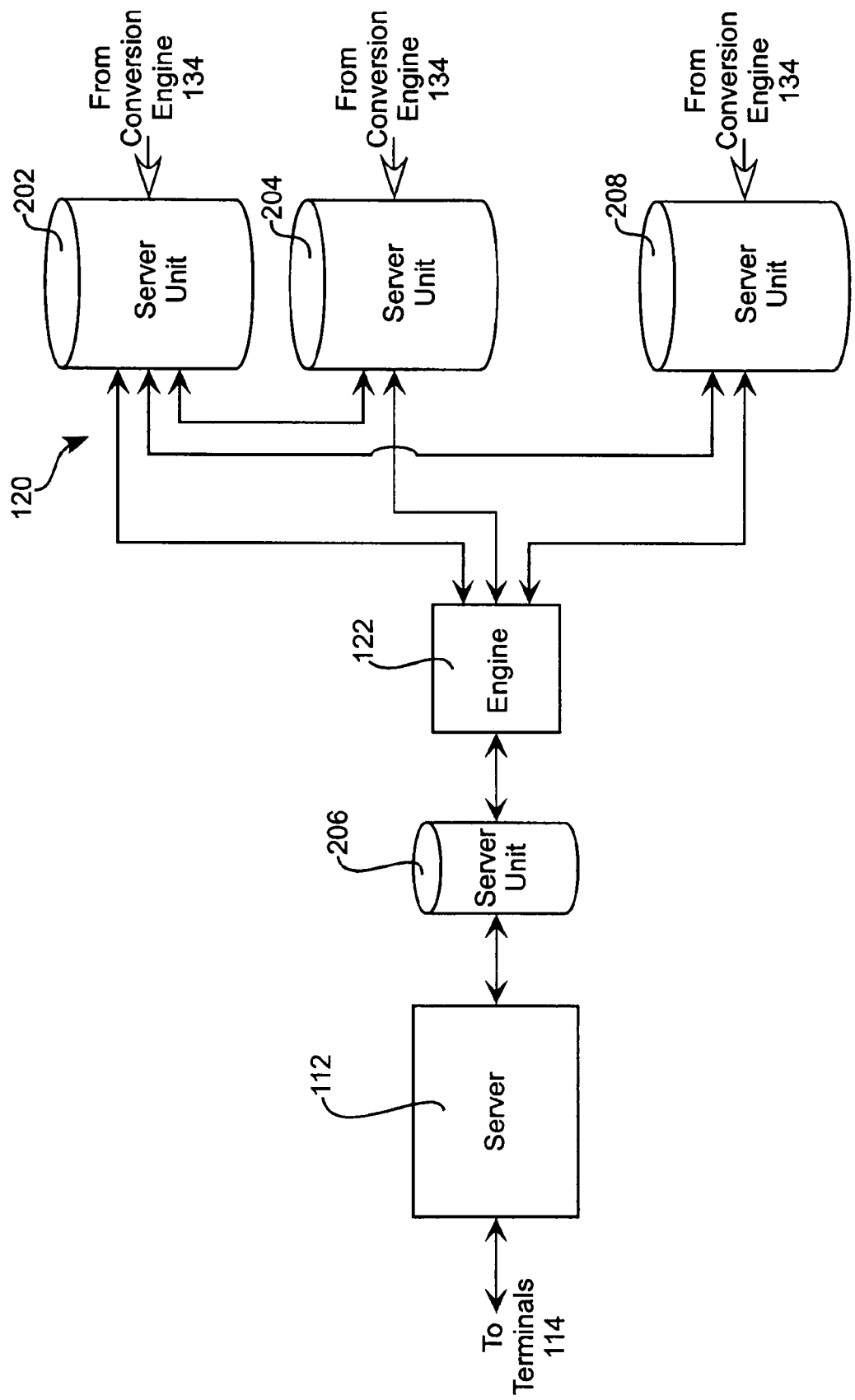
FIG. 2 is a functional block diagram of an embodiment of a database unit for the system of FIG. 1.

Furthermore, the most significant digit of an element's reference numeral represents the figure number where that element is first introduced (e.g., element 204 is first introduced in FIG. 2).

DETAILED DESCRIPTION

A system and method for remote processing of electronic documents are described in detail herein. In the following description, numerous specific details are provided, such as the description of various graphical interfaces in FIGS. 4-6, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

As an overview, embodiments of the invention provide legal professionals with access to electronic legal documents, via a network such as the Internet. These legal documents can include email documents, for example, that are produced in response to discovery requests and which are loaded into a database accessible via a server. Other examples of "electronic documents" can include electronic calendars/schedules, word-processing files, spreadsheets, text and graphics files, various application files, or any other type of electronic file or data that can be stored in a computer-readable storage media, and which can be subject to a legal proceeding or need to be otherwise reviewed/accessed. Once access has been granted to authorized legal professionals, the legal professionals can perform online search queries, indexing, data manipulation, and various other online operations to obtain and track results of their document review. According to an embodiment of the invention, electronic characteristics (e.g., metadata and other properties) associated with a native format of the electronic legal documents can be substantially preserved and used to perform various indexing and processing operations. The native format of the electronic legal documents can include the various software program platforms used to create the electronic legal document.

Embodiments of the invention also provide the ability to detect electronic files having duplicative information. That is, through a variety of mechanisms, electronic files having duplicative information may be generated and may enter an electronic discovery system to be processed. According to an embodiment of the invention, electronic files having duplicate information are detected and processed in a manner that facilitates the review and processing of the electronic files by legal professionals. For example, the contents of such electronic files are not separately stored and indexed, but rather such electronic files may be linked or otherwise associated with another electronic file that has the same content already stored and indexed, thereby avoiding the need to separately store and index the same content of the duplicate electronic file. In another embodiment, electronic files having duplicative information are identified and may have their content separately stored and/or indexed.

Figure 1:
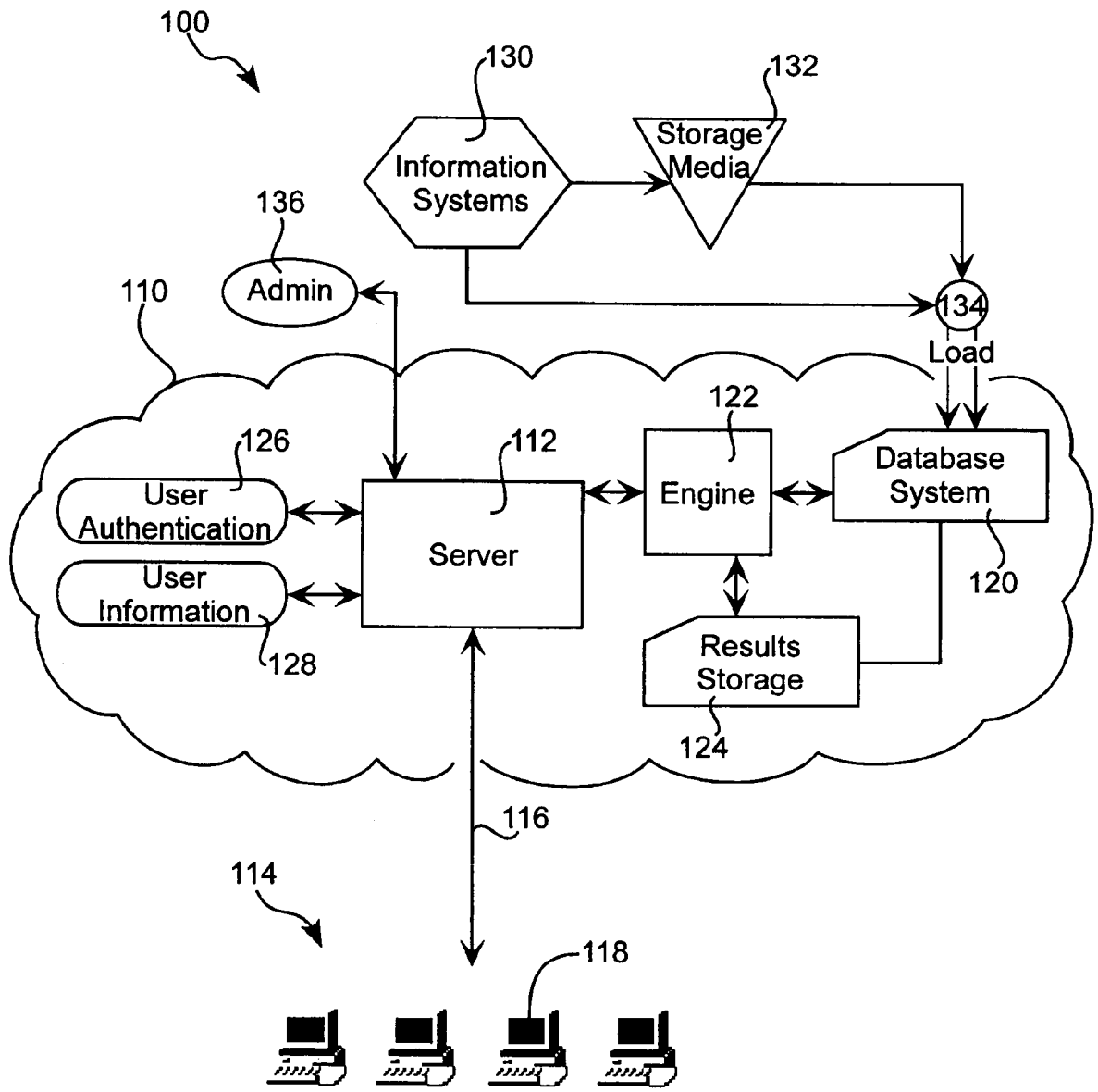
FIG. 1 shows a system for accessing and processing legal documents according to an embodiment of the invention.

In one embodiment, a hashing technique can be used to determine whether electronic files and/or portions thereof are duplicates of one another. Hashing of storage media having electronic files stored thereon may also be performed to determine whether storage media are duplicates of one another. Referring first to FIG. 1, shown generally at 100 is a system according to an embodiment of the invention. The system 100 can be implemented by a network 110, such as the Internet, but other types of communication networks may be utilized as well. For example, the network 110 can comprise a local area network (LAN), virtual local area network (VLAN), asynchronous transfer mode (ATM) network, or other network or portion of a network.

The system 100 includes one or more network servers 112 communicatively coupled to one or more terminals 114 via one or more links 116. The terminals 114 can comprise personal computers (PCs) of a law firm, for example, that are used by legal professionals (e.g., users) to access the server 112. The terminals 114 each have a display screen 118 that allows users to view information sent to and from the server 112. Other types of terminals 114 besides PCs can be used. For example, the terminals 114 can include workstations (e.g., dumb terminals) connected to an internal computer network, enhanced-functionality wireless devices having display screens, laptops, television monitors, etc.

The server 112 can comprise part of a server cluster, where there is more than one server 112 such that if one of the servers fails, there are backup servers available. According to one embodiment, the server 112 can be one or more servers specifically dedicated to the law firm that uses the terminals 114, with the law firm being the only party authorized to access the server 112. In another embodiment, one or more law firms may share the same server 112, with suitable access and security mechanisms being utilized to ensure that each law firm's transactions with the server 112 (or information reviewed and stored in the server 112) are kept confidential from each other.

The link 116 can include any type of high-speed data line(s) or network(s) that can accommodate high-speed bit rates, including T1, xDSL, SONET, ATM, Ethernet, etc. Telephone modem links may also be used. The link 116 can comprise hardwire links (e.g., twisted pair, optical fiber, coaxial, etc.) or wireless links (e.g., radio frequency, cellular, satellite, microwave, optical, etc.). A person skilled in the art will further appreciate that the speed of transmission of data via the link 116 may also vary from one system 100 to another, based on factors such as type of network or communication medium, level of network traffic, size of files being transmitted, etc. Therefore, embodiments of the invention are not limited by the specific type of terminals, networks, communication medium, data rate, etc. that are used by the system 100.

The system 100 can include one or more databases systems 120 to store electronic legal documents. The database system 120 can be part of the server 112 or it can be a separate network component communicatively coupled to the server 112. As will be explained in detail further below, the electronic legal documents stored in the database system 120 can be searched, sorted, processed, or saved using an engine 122. Because the terminals 114 are granted access to the database system 120 by the server 112, legal professionals using the terminals 114 can use the engine 122 to remotely search, sort, or process the electronic legal documents stored in the database system 120.

The database system 120 can store user input and other information saved by the user at the terminal 114. For example, and as will be explained later below with reference to FIGS. 2 and 4-6, the user can append identifiers (e.g., processing information such as whether a document is "hot") to relevant electronic documents being reviewed and then save these identifiers in the database system 120. Once stored in the database system 120, these electronic documents can be repeatedly accessed and their processing information modified, if desired.

According to another embodiment, results of the searching, sorting, processing, saving, etc. remotely performed by the legal professionals at the terminals 114 can be separately stored in a results storage unit 124, instead of or in addition to storing the results in the database system 120. The results storage unit 124 and the database system 120 can comprise any number of machine-readable or computer-readable medium, including but not limited to, random access memory (RAM), compact disks (CDs), digital video disks (DVDs), magnetic tape, floppy disks, microcode, and other mass storage units. In some embodiments, the results storage unit 124 can be part of the database system 120 or the server 112, while in other embodiments, the results storage unit 124 may be a separate component in the network 110. In other embodiments, the results storage unit 124 may be located in close proximity to the terminals 114 (e.g., in a hard drive of one of the terminals 114 or in a server located in the law firm's computer network). Accordingly, the embodiments of the invention are not limited by the specific type of storage medium used by the results storage unit 124 or by the database system 120, or by their specific location.

The system 100 can include a user authentication unit 126. The user authentication unit 126 stores passwords, security codes, or other confidential access information required for granting the terminals 114 with access to the server 112. Each time any of the terminals 114 requests access to the server 112, that terminal sends a password, for example, to the server 112, which then grants access if the password matches the authorized password stored in the user authentication unit 126. Each terminal 114 (e.g., each legal professional using their respective terminal 114) may be assigned a distinct password. In one embodiment, each legal professional is assigned a user account, and each law firm is assigned to a server cluster. Providing separate passwords to each legal professional allows each of them to maintain separate "user accounts" to store results of their individual document review or to allow them to manage their individual dockets. Individual user accounts, in turn, can have one or more sets of information that may be accessible to other users, while other sets of information are not shared.

Other types of security/access mechanisms may be used by the system 100. Another example is a secure identification (ID) token that changes based upon time and works in conjunction with a user's personal identification number (PIN).

The system 100 can further include a user information unit 128 to store information specific to the law firm or users of the terminals 114. Such information stored in the user information unit 128 can include, for example, address information, billing information, communication system information, etc.

Information systems 130 typically are the source of the electronic legal documents. The information systems 130 can belong to a party being requested to produce documents, for example. In one embodiment, the information systems 130 can download its electronic documents (in its native format) into storage media 132 (e.g., CDs, DVDs, magnetic tape). As will be described below with reference to FIG. 3, the information stored in the storage media 132 is, in turn, converted and indexed into a database format by a conversion engine 134 for storage into the database system 120.

It is also possible to provide an embodiment where the information systems 130 can provide the electronic documents directly to the conversion engine 134, without intermediately downloading the electronic documents into the storage media 132.

The server 112 may be communicatively linked to an administration unit 136. The administration unit 136 can be, for example, a company that provides and maintains the services of the server 112, including but not limited to, coordination of data downloads into the database system 120, providing user accounts and passwords for the terminals 114, providing customer service support, processing billing and account information, etc.

FIG. 2 shows in more detail the structure and operation of the database system 120. The database system 120 includes a plurality of server units 202-208, which can include machine-readable or computer-readable media storing relational databases or other types of databases (and their associated tables of data). The server units 202-208 (and their databases) can in turn be operated, processed, or controlled by suitable database algorithms and software.

The server units 202-208 are accessible by the engine 122 such that the engine 122 can perform transactions (e.g., send search queries, receive search query results, perform read/write operations) with the server units 202-208. The engine 122 is coupled to the server 112, via the server unit 206, thereby allowing the users at the terminals 114 to perform transactions with the server units 202, 204, and 208 using the engine 122.

As previously described above, the components shown in FIG. 2 can be separate network components communicatively coupled within the system 100. It is also possible to provide an embodiment where one or more of the components shown in FIG. 2 are physically located within the server 112. Accordingly, embodiments of the invention are not limited by the specific location of the various components shown in FIG. 2.

Databases or other storage media of the server units 202, 204, and 208 receive their data from the conversion engine 134, with the conversion engine 134 formatting the data for storage and subsequent indexing, including substantially preserving electronic characteristics (e.g., metadata) associated with the native format of the electronic legal documents. According to an embodiment of the invention, the server unit 202 can use a commercially available indexing search engine format and algorithms, the server unit 204 can use a commercially available ANSI SQL-compliant database format and related algorithms and data structures, the server unit 206 can use a world wide web (web) server, and the server unit 208 comprises a file server.

The server unit 208 stores read-only formats of the electronic legal documents, such as email messages or other electronic files involved in one or more litigation cases. The server unit 202 stores catalogs, databases (and corresponding tables) that index the textual content of the electronic legal documents stored in the server unit 208, as schematically represented in FIG. 2 by an arrow between these two server units. This allows the engine 122 to perform key word (e.g., text) search queries on the contents of the server unit 202. The server unit 204 stores databases (and corresponding tables) that contain metadata, threading, directory path, attachment, and properties information for the electronic legal documents stored in the server unit 208. This allows the engine 122 to perform search queries on the contents of the server unit 204, based on search criteria such as Bates number, source, recipient, date of transmission, modification date(s), cc'ed individuals, etc. The server unit 206 has, in one illustrative embodiment, Active Server Page (ASP) formatted pages through which users at the terminals 114 access the engine 122.

In operation, when the user sends a text or key word search query from the terminal 114 to the server 112 through the server unit 206, the engine 122 applies the query to the contents of the database(s) in the server unit 202, which can comprise cataloged information of the contents of the server unit 208. After identification of database entries matching the search query, the search query results are sent from the server unit 202 back to the engine 122 through the server unit 206, which in turn returns the search query results to the terminal 114. If any of the documents identified in the search query results is subsequently requested for viewing by the user, then a copy of that document is retrieved from the server unit 208 by the engine 122 and transmitted through the server unit 206 to the terminal 114.

Similarly, when a non-textual or metadata content search query (e.g., a search query requesting email messages sent by a specific individual on a specific date, etc.) is sent by the user from the terminal 114 to the server 112 through the server unit 206, the engine 122 applies the query to the contents of the database(s) in the server unit 204. The server unit 204 also can be searched in this fashion to identify a plurality of email messages belonging to a conversational thread and to identify attachments of email messages. After identification of database entries matching the search query, the search query results are sent from the server unit 204 back to the engine 122 through the server unit 206, which in turn returns the search query results to the terminal 114. If any of the documents identified in the search query results is subsequently requested for viewing by the user, then a copy of that document is retrieved from the server unit 208 by the engine 122 through the server unit 206 and transmitted to the terminal 114.

If the search query sent by the user from the terminal 114 is a combination of text and metadata (e.g., a request for email messages sent by a specific individual on a specific date, discussing a certain subject matter), then the search engine 122 can perform a parsing operation to split the query into a metadata search and a text search, where it first sends the query to the server unit 204 to identify documents matching the metadata search criteria. The server unit 204 then links with the server unit 202 to identify documents matching the textual search criteria. As before, the search results are returned to the engine 122 through the server unit 206 and then transmitted to the terminal 114. If any of the documents identified in the search query results is subsequently requested for viewing by the user, then a copy of that document is retrieved from the server unit 208 by the engine 122 through the server unit 206 and transmitted to the terminal 114.

It is possible to provide other embodiments of methods for doing mixed queries rather than by linking the server unit 204 to the server unit 202. For example, it is possible to do searches on both server units simultaneously and independently, and then combine (and narrow) their search results.

As will be explained below with reference to FIG. 4, the user may perform electronic processing operations on the copy of the electronic legal document(s) retrieved from the server unit 208. Such operations may include, for example, marking hot documents, marking a document as being reviewed or not reviewed, etc. and saving such user-input information. According to an embodiment of the invention, this user-input information may be saved in the databases of the server unit 204. That is, tables of relational databases in the server unit 204 may be updated to reflect the user-input information, and then the saved user-input information can be retrieved when the electronic legal document to which they pertain is subsequently requested for review. It is also possible to save user-input information in the server unit 202 or in the results storage unit 124 (see, e.g., FIG. 1).

Figure 3:
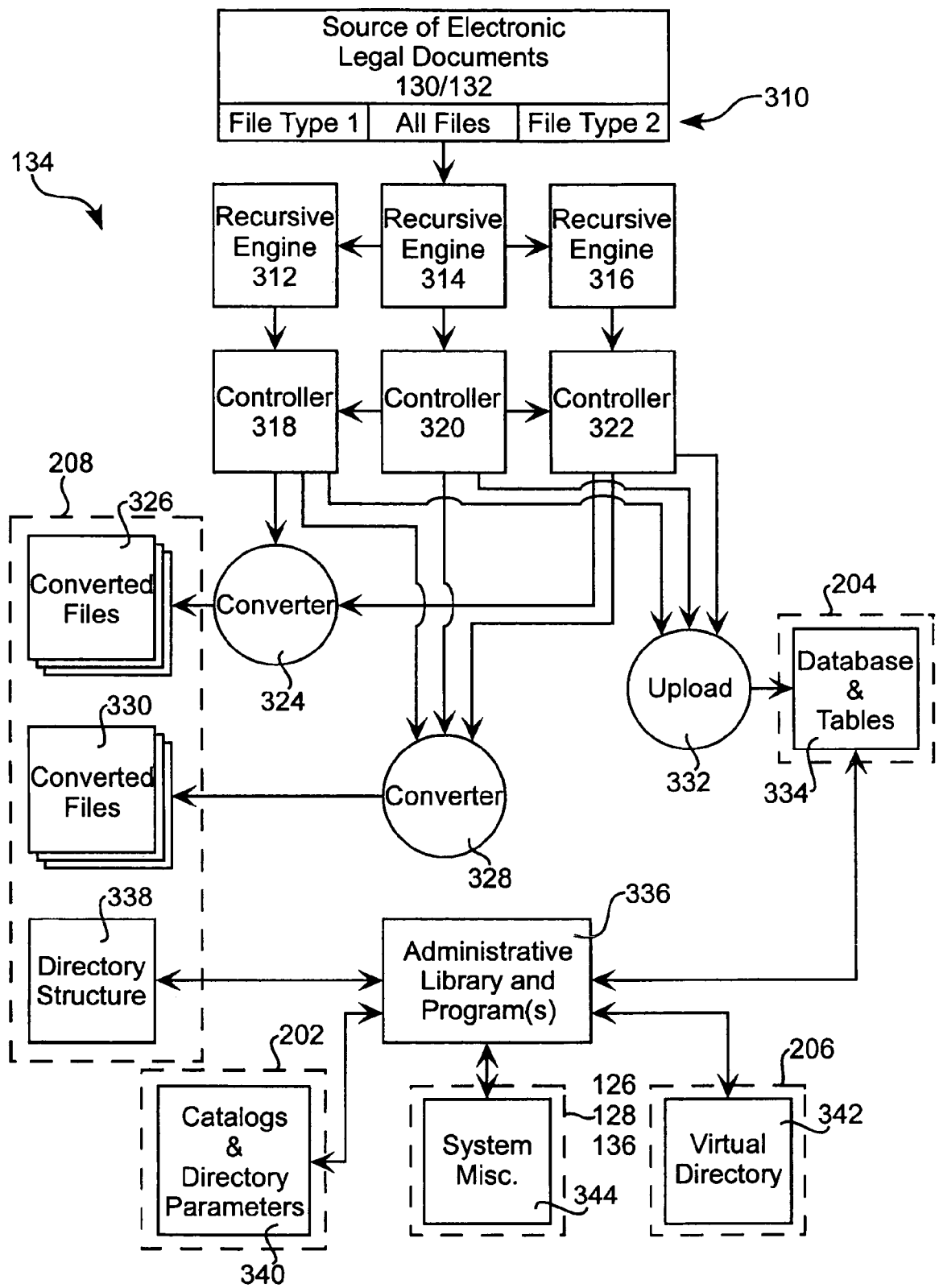
FIG. 3 is a flow diagram illustrating an example of a conversion method for loading electronic documents into the database unit of FIG. 2.

Referring next to FIG. 3, an embodiment of the conversion engine 134 is shown. The conversion engine 134 converts electronic legal documents from their native format into a format suitable for storing and indexing in the database system 120 described above, while still maintaining electronic characteristics (e.g., metadata including threading information, attachments, properties, directory structures, etc.) associated with the native format.

Initially, FIG. 3 shows that the electronic legal documents are provided by the information systems 130 or storage media 132 of FIG. 2. The electronic legal documents can be plurality of different file types 310. As examples, File Type 1 can be (Microsoft Outlook™) Exchange™ files having a .pst file extension, while File Type 2 can be IBM Lotus Notes™ files having a .nsf file extension. These file types can further include appointment calendars and contact lists, and other types of objects associated with such email platforms/programs.

One of the file types 310 is labeled in FIG. 3 as "All Files," which can include non-email file types, File Type 1, File Type 2, etc. Non-email file types may include files created by all sorts of software programs and can include files having .doc, .txt, .xls, .wp5, etc. file extensions, for example. The file types 310 are often arranged according to a directory structure, such as a tree structure, with email file types often storing data in an internal directory structure that has multiple paths and multiple objects. There can be any number of file types, files, objects, etc. provided by the information systems 130 or storage media 132.

The conversion engine 134 includes a plurality of recursive engines 312-316 to process the file types 310, with this processing shown symbolically in FIG. 3 by a single arrow from the file types 310 to the recursive engine 314. The recursive engines 312-316 "recursively" go through every path in a directory structure and extracts the files in each path, while still preserving the directory structure from which the files are taken. While three recursive engines 312-316 are shown in FIG. 3, there can be any number of recursive engines used, with each recursive engine corresponding to a different file type 310. That is, for example, the recursive engine 312 extracts files having File Type 1 file extensions from directories, and the recursive engine 316 extracts files having File Type 2 from directories. The recursive engine 314 extracts files having non-email file extensions from directories. Because the individual files themselves may have attachments that are of a different file type (e.g., an email may have a .doc attachment), one embodiment of the invention has recursive engines 312-316 that extract the files and their attachments together, without separating the attachment from the email. In another embodiment, the recursive engines 312-316 do perform a separation such that the email is extracted by the recursive engine 312 (or 316), and the attachment (non-email format) is extracted by the recursive engine 314, while the information noting the relationship between the email and attachment is preserved.

According to one embodiment, any one of the recursive engines 312-316 can first analyze the electronic legal documents provided by the information systems 130 and/or storage media 132 to determine if these electronic legal documents include file types that it can extract. In other words, the recursive engine 312 searches for files (and directories) that have File Type 1 file extensions, for example. In another embodiment, there may be a separate engine (not shown) that analyzes the electronic legal documents to determine their file type(s) or file extensions and then directs the appropriate recursive engine 312-316 to the corresponding files, so that the directed recursive engine can perform its file extraction. In yet another embodiment, the recursive engines 312-316 can cooperate with each other such that if a file having a different file type is identified by one of the recursive engines 312-316, it can call one of the other recursive engines to extract that file. For example, the recursive engine 314 can review all of the file types 310 and then call the other recursive engines 312 and 316 if it finds file types that the recursive engines 312 and 316 can process, as shown symbolically in FIG. 3 by arrows pointing from the recursive engine 314 to the other recursive engines 312 and 316.

Once the files (and their directory structure) have been extracted by the recursive engines 312-316, a plurality of controllers 318-322 corresponding to a respective recursive engine perform operations on the extracted files. For instance, the controllers 318 and 322 analyze the files provided by the recursive engines 312 and 316, respectively, and send them to a converter 324 if the files contain email and related messages. The converter 324 then converts/translates these email and related messages into converted files 326 having a format that can be displayed and/or manipulated in a browser window at the terminal 114. For example, each email message or each calendar entry can be converted into one of the converted files 326. According to one embodiment, the converted files 326 can comprise HTML files, and it is understood that the converted files 326 can comprise other types of files. The converted files 326 are stored in the server unit 208.

If the files provided to the controllers 318 and 322 are emails and related messages having attachments, then the attachments are sent to a converter 328. The converter 328 translates these attachments into converted files 330 having a format that can be displayed and/or manipulated in a browser window at the terminal 114. The converted files 330 are also stored in the server unit 208. According to one embodiment, the converted files 330 can comprise .pdf files, and it is understood that the converted files 330 can comprise other types of files. One advantage of converting attachments into .pdf format is that .pdf files provide a layer where textual content of the attachments can be indexed, searched, or processed (e.g., highlighted).

The converter 328 can incorporate a number of software packages or tools to allow it to read, launch, and convert the attachments. For example, the converter 328 can use multiple versions of most application programs and/or use various application programs that can read and translate files created from other types of application programs.

Metadata, including conversational thread information, properties, and other electronic characteristics of the files (e.g., electronic legal documents) are extracted by the controllers 318 and 322 and directed to an upload unit 332. The upload unit 332 stores this electronic characteristic information in databases and tables 334 in the server unit 204.

The controller 320 functions similarly as the controllers 318 and 322, except that it processes non-email files. As with attachments to email files, these non-email files are sent by the controller 320 to the converter 328, which converts the files into the format of the converted files 330. Metadata, including directory path information, and other electronic characteristics of these non-email files are sent by the controller 320 to the upload unit 332 for storage in the database and tables 334 in the server unit 204.

To the extent that, while processing files, the controllers 318-322 identify files having different file formats, one embodiment of the conversion engine 134 allows the controllers 318-322 to call an appropriate controller that can process that different file format. For instance, if the controller 322 finds an email attachment having a format corresponding to a format that is designed to be processed by the controller 318 or by the controller 320, then the controller 322 can call these controllers to perform the required processing.

An administration library having administration programs 336 creates a directory structure 338 in the server unit 208. The directory structure 338 is used to manage and index the converted files 326 and 330. The administration programs 336 further create catalogs and directory parameters 340 in the server unit 202. The catalogs and directory parameters 340 point to specific pieces of data in the converted files 326 and 330 and in the directory structure 338, thereby allowing text searches to be performed as previously described above.

For the information stored in the database and tables 334 in the server unit 204, the administration programs 336 also creates catalogs and database parameters (not shown) that allows metadata searching to be performed as described above. Additional functions of the administration programs 336 are to create a virtual directory 342 in the server unit 206. The virtual directory 342 helps the user at the terminal 114 to use the engine 122 to search for and locate the various information converted and stored by the conversion engine 134. Miscellaneous system catalogs and database parameters 344 can be created by the administration programs 336 to allow various user access and management information to be stored and used by the administration unit 136, user authentication unit 126, and/or the user information unit 128.

The recursive engines 312-316, controllers 318-322, converters 324-328, upload unit 332, and administrative unit 336 can comprise suitable software programs and/or algorithms/routines that are stored in one or more computer-readable storage media, as well as corresponding hardware to allow the software programs to perform their functions as described above.

Although email messages are described throughout this description as one form of electronic legal document that may be processed by the conversion engine 134, it is understood that embodiments of the invention may be made applicable to other types of electronic legal documents. Other examples include file directories and electronic files (e.g., a word processing file, graphics file, etc.) that are not necessarily attached to email messages. The conversion engine 134, using the controller 320, can convert these types of electronic documents for storage and indexing in the database system 120 such that the directory structure(s), file and properties information, and other such native format data are substantially preserved. Another example includes electronic legal documents derived from scanned printed documents using optical character recognition (OCR). In such a case, the conversion engine 134 can use fuzzy logic algorithms that can reconstruct threads based on the information appearing on the printed documents.

Figure 4:
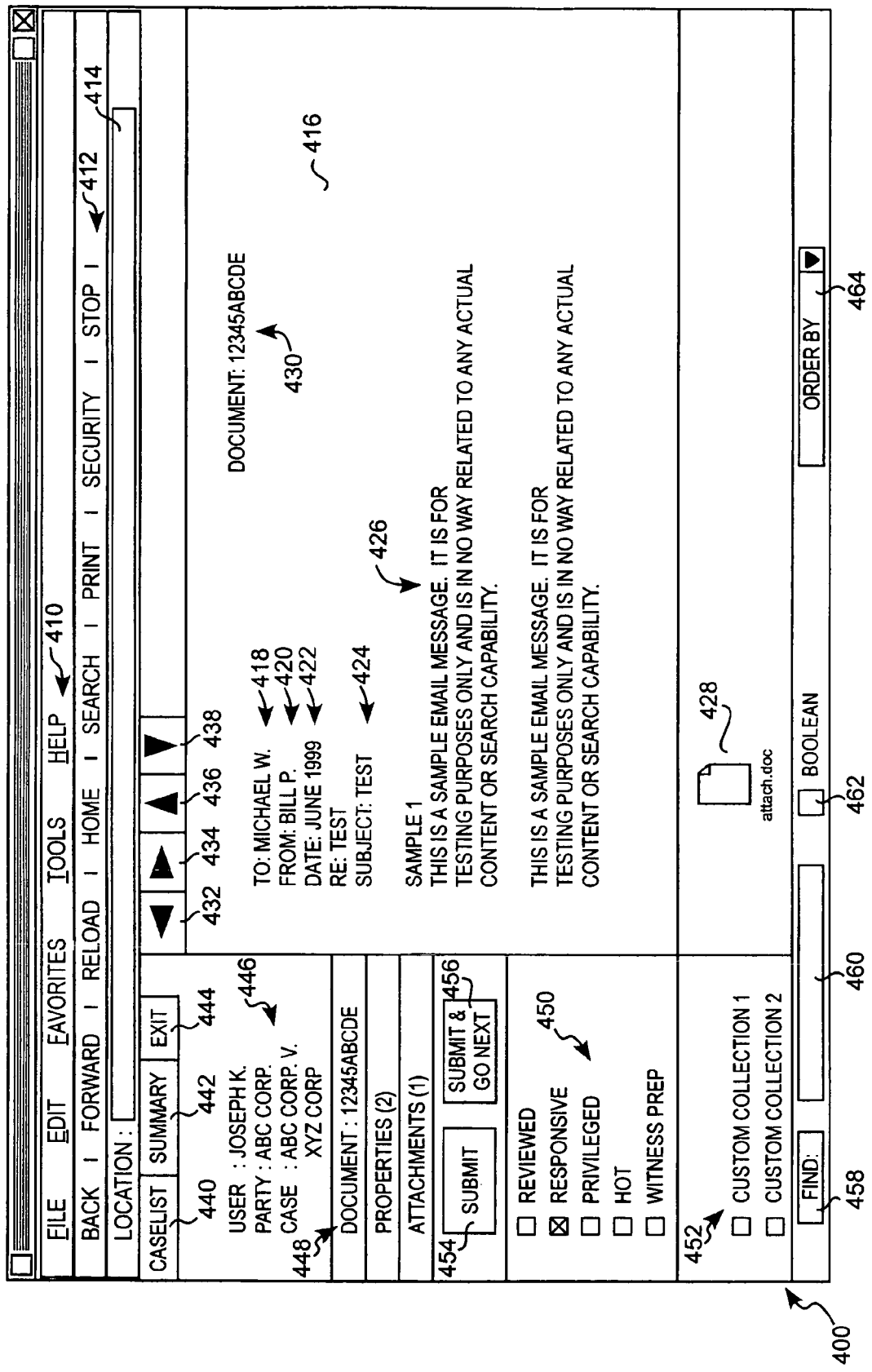
FIG. 4 is screenshot of a user interface according to an embodiment of the invention showing processing features for an electronic legal document.

FIG. 4 shows an embodiment of a user interface 400 according to an embodiment of the invention. The user interface 400 can comprise a graphical display generated on the display screens 118 of the terminals 114 by commercially available web browsers, such as Microsoft's Internet Explorer™ or Nescape's Navigator™. The user interface 400 includes controls 410 and a menu bar 412. An address field 414 can display a uniform resource locator (URL) address of the server 112 or an address of any other network component of the system 100 that provides the information displayed by the user interface 400.

The user interface 400 displays representation of an email message 416 in one of its viewing windows. The email message 416 can be displayed in a format in the viewing window such that the email message 416 appears substantially the same as it would have appeared had it been displayed in its native form. Although the email message 416 is typically one of the electronic legal documents produced in response to discovery requests that is stored in the database unit 120, it is understood that other types of electronic document may be stored and displayed. Like conventional email messages, the email message 416 includes a "To" field that identifies its recipient, a "From" field that identifies its sender, a "Date" field that identifies the date of transmission, and a "Subject" field that identifies the subject of the email message 416. The email message 416 may also contain other relevant information such as cc and bcc addresses (not shown). The email message 416 further includes text 426, and possibly one or more attachments 428. The attachment 428 can comprise any type of file, including graphic, text, executable, and application files. As previously described above, each of these items in the email message 416 can be searched for and reviewed by embodiments of the invention. Each email message 416 is also assigned with a Bates number 430 to identify that particular email message from other email messages produced during discovery.

The user interface 400 can include a plurality of sequencing buttons 432-438. If the button 432 is pressed (e.g., clicked on by a mouse of the terminal 114), an email message "preceding" the currently displayed email message 416 is displayed. If the button 434 is pressed, an email message "subsequent" to the currently displayed email message 416 is displayed. The "preceding" email message can be an email message having a Bates number immediately prior to the Bates number 430 of the currently displayed email message 416, or the "preceding" email message can be a previous email message in a group of email messages (e.g., email messages retrieved in response to a search query by the user, email messages sent by a particular individual, etc). Similarly, the "subsequent" email message can be an email message having a Bates number immediately subsequent to the Bates number 430 of the currently displayed email message 416, or the "subsequent" email message can be a subsequent email message in a group of email messages.

Clicking on the button 436 results in the display of a previous email message, if any, in a conversational thread of the displayed email message 416. Similarly, clicking on the button 438 results in the display of a subsequent email message, if any, in a conversational thread of the displayed email message 416. When the buttons 436 and 438 are clicked to view emails in a conversational thread, a metadata query is in effect sent from the terminal 114 to the engine 122 through the server unit 206, and then subsequently to the server unit 204 or to the server unit 208 such that the requested email message can be retrieved. Accordingly, an advantage is provided by this embodiment of the invention over existing document review methods in that conversational threads are automatically linked from one email message 416 to another, and thus can be easily followed and reviewed by the user.

The user interface 400 can include a caselist button 440 that, if clicked, results in the display of a list showing the user's docket of cases, cases being handled by the user's law firm, or both. If any of the cases listed on the displayed docket is selected, then electronic legal documents from that selected case may be accessed and processed by the user.

The user interface 400 can further include a summary button 442 that, if clicked, displays processing summary information for electronic documents for particular cases. An example of the summary information will be explained in further detail below with reference to FIG. 5. An exit button 444 allows the user to exit the system 100.

The user interface 400 can provide identification information to assist the user. For example, case information 446 identifies the current user who is reviewing the email message 416, a party that produced the email message 416, and the name of the case. Document information 448 provides further information specific to the displayed email message 416, including its Bates number, number of properties and metadata, and number of attachments.

A plurality of document processing boxes 450 may also be provided for each email message 416. The user can check off one or more of these processing boxes 450 to indicate whether the displayed email message 416 is reviewed, responsive, privileged, hot, or suitable for witness preparation. If the user wishes to add the displayed email message 416 to a customized collection, then one or more custom collection boxes 452 may be checked off. A customized collection can be any type of collection of electronic documents that the user wishes to establish. For example, there may be a customized collection of email messages received by a specific individual, a customized collection of email messages relating to a subject matter, a customized collection of email messages sent by an individual during a specific month, etc. The custom collection may in turn be designated as private so that only the user can access that user's custom collections, or designated as public so that other users may have access to the custom collections.

After the user has finished processing the displayed email message 416 (e.g., has indicated that the email message 416 is reviewed, responsive, etc. by checking off the processing boxes 450 or has assigned the email message 416 to a custom collection by checking off the custom collection boxes 452), a submit button 454 can be clicked to "save" the user's processing results. Saving the user's processing results involves updating relational database tables in the server unit 204 associated with the currently displayed email message 416. The relational database tables thus store and update information indicating that the email message 416 is reviewed, responsive, etc. or is assigned to a custom collection. Thus, whenever that particular email message 416 is subsequently requested for later review via the user interface 400, the saved information associated with the processing boxes 450 or the custom collection boxes 452 can be viewed.

According to one embodiment of the invention, a submit and go next button 456 can be provided. This button 456 allows the user's processing results for the currently displayed email message 416 to be saved, subsequently followed by automatic display of a next email message in the sequence.

In addition to the processing buttons 450 that provides status/summary information for each email message 416, it is possible to provide a "highlighting" function to highlight specific portions (e.g., portions of the text 426) of each email message 416. Such highlighting functions are useful for quickly locating highly relevant text. For example, the terminal 114 and user interface 400 can be provided with features such that if the user uses a mouse to click and drag over regions of the email message 416, those regions become boldface, change text color, have their background highlighted in yellow, etc. A subsequent click of the submit button 454 saves the highlighted specifications to the server 204 so that they can be reviewed later.

The system 100 may be provided with searching capability via the user interface 400 such that if a find button 458 is pressed, a search according to a keyword query entered in a search field 460 is conducted. The search may be a Boolean search if a Boolean box 462 is checked. Examples of search criteria include source, recipient, cc'ed individuals, date, and associated threads. It is also possible to provide natural-language-searching capabilities, and to save search results or search queries, as will be described later below with reference to FIG. 6. The method by which an embodiment of the invention conducts a search of stored email messages 416 was previously described above with reference to FIG. 2.

Other features may be provided to the user to assist the user in reviewing electronic documents. An example includes an ordering button 464 that provides the user with several options as to the manner in which email messages 416 are displayed by the user interface 400. Also, the user may be provided with a field (not shown) where the user can enter (and subsequently save and display) notes or comments regarding the displayed email messages 416. The user may also be provided with conversational group features that allow several users to access and share, between them, each other's notes/comments regarding specific email messages 416.

In summary, electronic documents are stored in the system 100 such that electronic characteristics associated with a native format of the electronic documents can be used in conjunction with the user interface 400 to provide the user with document processing capabilities that are unavailable with traditional methods of processing hardcopy legal documents. Documents may be electronically and easily searched, identified, tracked, and subsequently recalled at a touch of a button (or click of a mouse). Further, because of the network configuration of an embodiment of the invention that provides multiple, remote access to electronic legal documents, the need to confine a group of legal professionals in a single room to sift through a single copy of printed hardcopies is eliminated.

FIG. 5 shows processing summary information associated with electronic documents stored in the database system 120. The user interface 400 displays this summary information if the summary button 442 is pressed, for example. Summary information regarding the electronic documents may be displayed according to different categorical criteria 512, including but not limited to, source, recipient, date, Bates number, or custom collection. In the example shown in FIG. 5, the summary information is displayed according to the "sources" of the email messages. The "sources" of the email messages include a plurality of individuals' names 514 that sent email messages. Each individual name 514 in turn has a total 516 identifying the number of email messages sent by each individual and which are stored in the database system 120. From the total 516, there is a breakdown of how many of these email messages are responsive 518, not responsive 520, hot 522, suitable for witness preparation 524, privileged 526, not reviewed 528, and reviewed 530. Each of the other criteria 512 (e.g., date, Bates number, etc.) is also provided with these categorical totals.

Each of the individual names 514 or the numbers within the categorical totals 516-530 can be provided with hypertext or search query links such that the user can click on these links to view the corresponding electronic documents. That is, for example, if the numeral 31 of the "hot" documents for "Trish M." is clicked, then each of the 31 email messages are retrieved and displayed similarly as shown in FIG. 4 for review by the user.

If the displayed summary information shown in FIG. 5 are hypertext links, then clicking on the hypertext links results in a redirection of the user's browser to a URL address in the system 100 where the requested electronic documents may be reviewed. If the displayed summary information shown in FIG. 5 are search query links, then clicking on one of these links triggers a query by the engine 122 through the server unit 206 to the server unit 202, server unit 204, server unit 208, or any combination of these, such that the requested documents are retrieved from the server unit 208 and displayed by the graphical interface 400. For instance, clicking on the numeral 31 "hot" documents for "Trish M." formulates a query which may be in the form: Trish M./Total/Reviewed/Responsive/Hot. A different query may be in the shorter form: Trish M./Hot, with the various query formats dependent on factors such as type of search algorithm used by the engine 122, type of database structure and organization, relational database type, etc.

The summary information shown in FIG. 5 provides the user, or other users in the law firm, with a convenient and simple display that categorizes and identifies the most relevant results of document review. Further, the most highly relevant documents can be easily identified from a list and then accessed/retrieved by selectively clicking on a link, which is a significant advantage over existing methods where relevant documents are manually indexed and retrieved.

Figure 6:
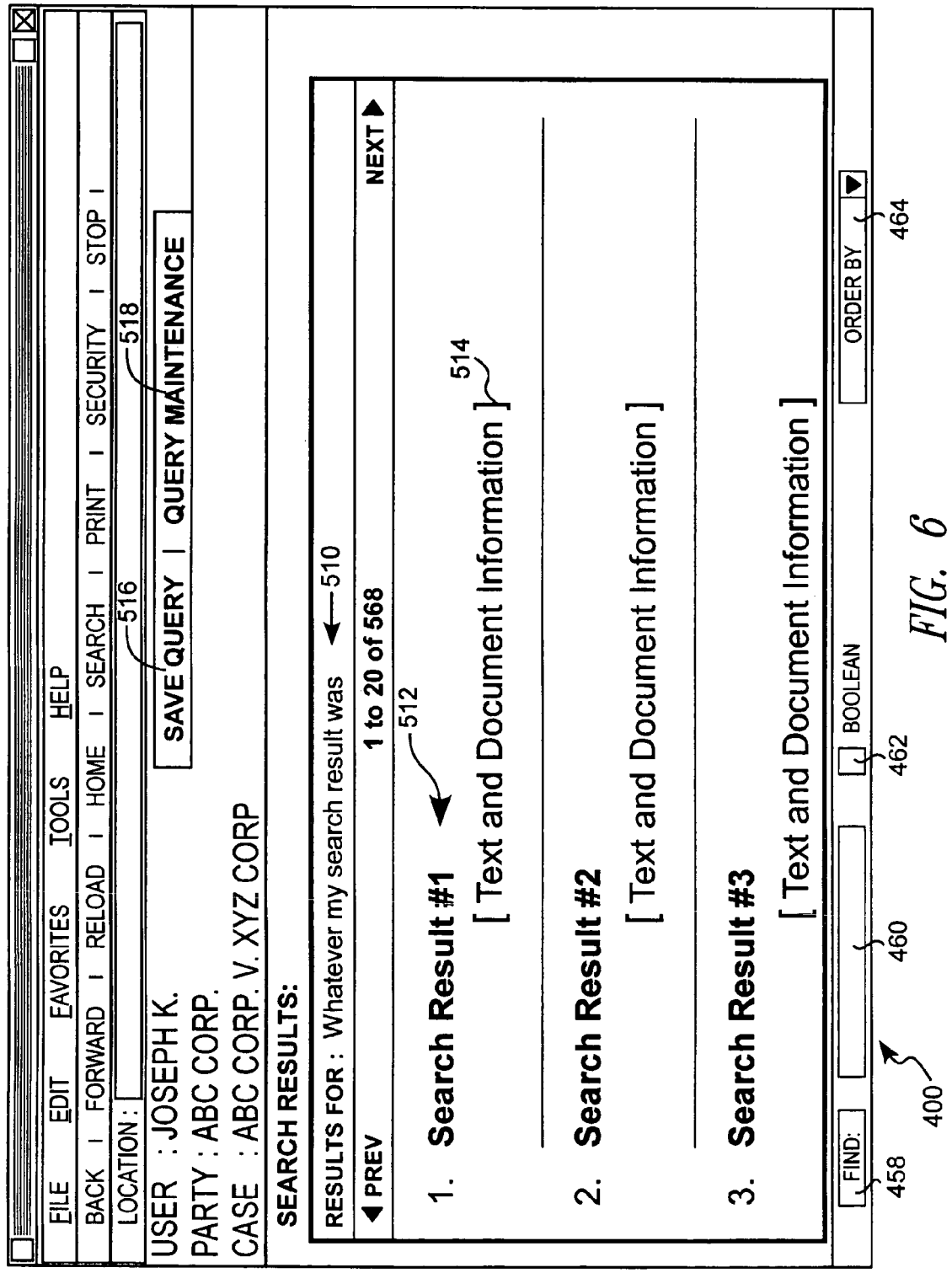
FIG. 6 is screenshot of a user interface according to an embodiment of the invention showing search query results for legal documents.

FIG. 6 shows the manner in which the user interface 400 can display search query results if the user submits a search query by entering a search query in the search field 460, checking the Boolean box 462 if appropriate, and then clicking the find button 458. After the find button 458 is clicked, the search query is submitted by the engine 122 to the server unit 202, server unit 204, or both. The search algorithm described above with respect to FIG. 2 is used, and then the engine 122 returns the search query results to the terminal 114 for display by the user interface 400 according to FIG. 6.

The search query can be displayed on a window 510, along with one or more listings 512 identifying relevant email messages. Each listing 512 can in turn be accompanied with text and document information 514. The information 514 can include, for example, an excerpt of the email message having the key words of the query, the first few lines of the email message, etc., along with other information such as date, source, recipient, etc.

The listings 512 can be hypertext or search query links themselves, such that if they are clicked, the engine 122 retrieves a copy of that email message from the database system 120 and displays the retrieved copy according to FIG. 4. The user interface 400 may also be provided with fields (not shown) to allow the user to enter a listing number of an email message to be retrieved (e.g., by entering a "2" to retrieve search result #2).

The user interface 400 may be further provided with a save query button 516 that allows a query and/or corresponding search results to be saved. A query maintenance button 518, if clicked, provides the user with menus to allow the user to modify a query, retrieved saved queries, prepare a new query, etc.

Embodiments of the invention also provide the ability to detect electronic files having duplicative information. One of the basic problems within electronic discovery is the massive amount of duplicative electronic documents that potentially may need to be reviewed for relevancy, privilege, etc. by legal professionals. Such electronic documents can include, for example, emails having duplicative content that were previously communicated between various third parties that may now be parties of or otherwise involved in a litigation. Such emails are produced in response to discovery requests and then examined via the system 100 described above.

There are two example ways that electronic files having duplicative information are created by such third parties prior to commencement of a legal proceeding, such as a discovery proceeding of a lawsuit. A first way in which electronic files having duplicative content may be created is through the sending of emails. For example, if an email is sent, both the sender and the recipient have copies: one copy is in the sender's Sent Items box, while another copy is in the recipient's Inbox. Each of those email copies has duplicative information, such as subject, body, attachments (if any), and some static metadata that does not vary from one email to another (e.g., date created, date sent, data in the From and To fields, etc.). Further, if the email is sent to more than one person, such as company-wide email or a group email, many duplicative data may be created.

A second way in which electronic files having duplicative information may be created and encountered is through "rolling" processing of electronic files. For example, a container file (such as a .pst or .nsf file) that contains all of a user's email may be entered/stored into an information system (e.g., the information systems 130 of FIG. 1) in the form of a back-up January tape, and then delivered to the conversion engine 134 for processing in response to a discovery request. As part of the ongoing discovery process, another container file may later be delivered to the conversion engine 134 in the form of a back-up February tape. The container file from the February backup tape contains the January email in the user's In and Out boxes, as well as the incremental February email. Thus, the container file from the February backup tape may contain emails that are duplicative of emails from the January backup tape, and if delivered to an electronic discovery system, multiple duplicate emails potentially now need to be processed and provided for review to legal professionals.

Generally speaking, for electronic discovery purposes, legal professionals involved in litigation wish to know the location of or otherwise manage electronic files having duplicative information, for several reasons. First, legal professionals that represent parties served with a discovery request (and/or legal professionals reviewing electronic files that have been produced by the opposing party in response to a discovery request) may want to be able to code electronic files in their possession for consistency. For example, if a first reviewing attorney identifies a certain first electronic document as falling under the attorney/client privilege, then that first reviewing attorney can mark/identify that first electronic document as "privileged." However, a second reviewing attorney may review a second electronic document (which is a copy of the first electronic document) and not be aware of the presence of the first electronic document, and therefore, the second reviewing attorney may not realize that the contents of both electronic documents are privileged. In this example situation, the second reviewing attorney may produce the second electronic document to opposing counsel, thereby inadvertently waiving privilege. To reduce the chances of such errors from occurring, the reviewing legal professional(s) may want to code, classify, annotate, or otherwise identify all of the copies of the electronic document (e.g., email) as attorney/client privileged so as to avoid accidental waiver of privilege.

Second, parties served with a discovery request often want to be able to produce just the requested documents. That is, in commercial lawsuits or other types of litigation, parties are often asked to produce only one version of electronic files such that their own counsel and/or opposing counsel is not overwhelmed by duplicative data.

Third, parties involved in discovery or other legal proceedings that involve massive document review often want to minimize attorney time in reviewing the received documents, since the costs in paying attorneys to review duplicate electronic files multiple times may be substantial. Embodiments of the invention thus provide the ability to recognize electronic documents having duplicative information, and then deal with them appropriately, thereby substantially ensuring consistent coding of duplicate data, saving attorney costs, and otherwise reducing inefficient and repetitive processing of duplicate data.

Figure 7:
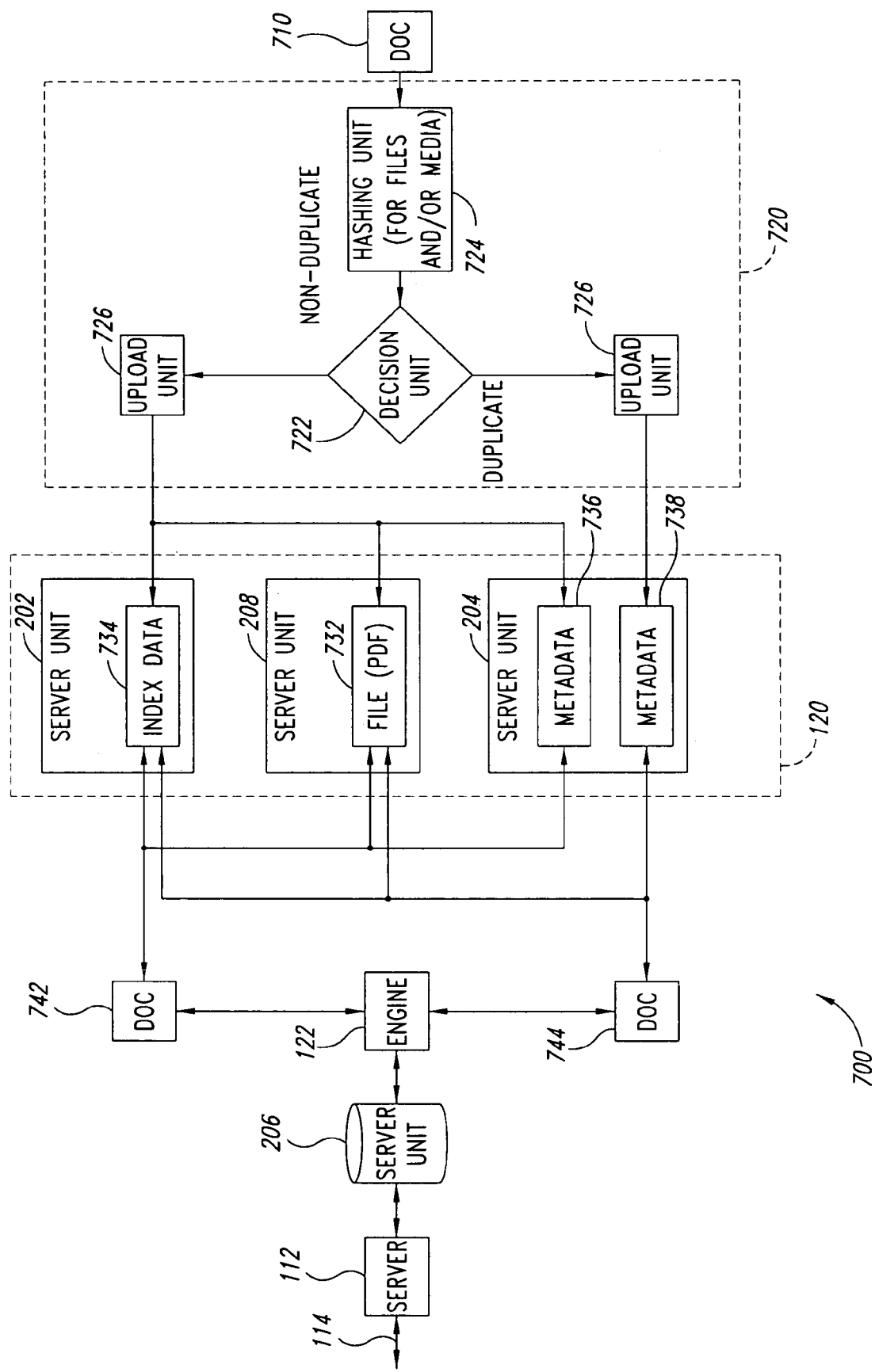
FIG. 7 is a functional block diagram of another embodiment of a system for accessing and processing legal documents, including electronic files having duplicative information

A "de-duplication" feature may thus be used to determine the manner in which duplicate electronic documents are to be identified and processed by an embodiment of the system 100. FIG. 7 shows in more detail the structure and operation of an embodiment of a sub-system 700 for detecting and handling the processing of electronic documents having duplicative information, such as duplicate emails. Elements of FIG. 7 that are similar to those in FIG. 2 are labeled similarly.

First, an electronic document or other electronic file 710 is produced in response to a discovery request, for example. The electronic file 710 can comprise, for instance, an individual file (such as an email, attachment, graphic file, text file, audio-video file, calendar, spreadsheet or other type of electronic file) and/or a group of files (such as zipped files, .pst file or other container files that have a plurality of emails, etc.) In one embodiment, the electronic file 710 may reside on the storage media 132, and delivered during the rolling discovery process described above, for example. In other embodiments, the electronic file 710 may reside directly in the information system 130 and produced in response to a document production request in a legal proceeding. In either embodiment, the produced electronic file 710 may be processed by a conversion engine 720 containing at least one hashing unit 724, one or more upload units 726, and a decision unit 722.

The hashing unit 724 first reads the electronic file 710 to create a hash. In general, a hash of an electronic file may be based at least in part on the pattern of zeros and ones of the underlying machine data. The pattern of zeros and ones may be used to generate a hash or other unique ID of the electronic file 710. The created ID/hash may then be used to determine whether the electronic file 710 is unique by comparing its ID/hash with the ID/hash of other electronic files. If there are similar patterns of ones and zeros in the two electronic files, then identical hashes are created, thereby indicating that the two electronic files are duplicates.

The hashing unit 724 of one embodiment creates the hash for the electronic file 710 using any suitable hashing algorithm, such as MD5 or SHA1, for example. In one embodiment, the hashing unit 724 can create the hash based on all or a portion of the content of the electronic file 710. For example, the hashing unit 724 may hash the body (such as text) of an email plus static metadata associated with the email, including information that specify the date created, date sent, date modified, data in the From and To fields, etc. Static metadata includes metadata that does not vary between duplicate files.

If the electronic file 710 is an email, there may be many duplicate versions obtained from the storage media 132 or from the information system 130. For example, the email may have been sent by one person to many people, and therefore may be located in many recipients' inbox files as well as the sender's outbox file. As such, certain pieces of metadata, such as the message body and subject line, remain exactly the same and may be used by the hashing unit 724 to create a hash.

In an embodiment, at least some or all portions of attachments to emails and/or application files (or other electronic files) may also be hashed. To further illustrate by way of example, two electronic files may be entitled REPORT.doc (e.g., a Microsoft Word file) and SUMMARY.xls (e.g., a Microsoft Excel file). Assume further for purposes of this example that the content (body) of both electronic files is identical, with the only differences being in the file titles (i.e., "REPORT" versus "SUMMARY"), the file formats (i.e., Word versus Excel), and perhaps some or all of their associated metadata (e.g., date created, date modified, number of bytes, etc.).

In such an example, the hashing unit 724 can be programmed or otherwise set to select which portions of the two electronic files to hash, so that the determination of the degree of "duplicativeness" between the two electronic files can be customized as needed. For instance, if legal professionals as a matter of practice deem two documents to be duplicates if they have identical content (regardless of the similarities and/or differences in the metadata), then the hashing unit 724 can be programmed such that only the content of the Word and Excel files are hashed. The file titles (which are different) and the metadata (which may or may not be different) are not hashed, since the legal professionals are only concerned with the body of the Word and Excel files, but such metadata information may be stored or otherwise recorded if necessary.

If, on the other hand, the legal professionals as a matter of practice deem two documents to be duplicates if they have identical content plus identical static metadata, then the hashing unit 724 can be programmed such that the content plus the static metadata of the Word and Excel files are hashed. In this case, certain dynamic metadata (which may vary from one electronic file to another, but does not substantively differentiate one electronic file from another, such as the file name or file size in this example) need not be hashed, but can be stored if necessary for other uses.

Once created, the hash associated with the electronic file 710 may be compared by the decision unit 722 to hashes associated with other files and which were also generated by the hashing unit 724. The decision unit 722 then determines whether the electronic file 710 is a duplicate based on whether a duplicate hash was found, in one embodiment. If the decision unit 722 locates a hash associated with another file that matches the created hash, the electronic file 710 may be identified as a duplicate. On the other hand, if decision unit 722 locates no other matching hash, the electronic file 710 may be identified as a non-duplicate or otherwise classified as a unique or "original" electronic file.

An upload unit 726 then passes data to the database system 120 based on the determination of the decision unit 722. As will be discussed in more detail below, if the decision unit 722 determines that the electronic file 710 is not a duplicate, the upload unit 726 stores data in each of server units 202, 204 and 208 in a manner similar to that described above in relation to FIGS. 3 and 4. For example, in one embodiment, the upload unit 726 converts the electronic file 710 into a format that is readable by the terminals 114 (such as a PDF or HTML file for example), and directs the converted file to the server unit 208 to be stored as a read-only file 732 in the server unit 208. In addition, the upload unit 726 stores the content (such as text) of the electronic file 710 as index data 734 that is stored in the server unit 202. Further, the upload unit 726 extracts metadata (static and/or dynamic) from the electronic file 710 and directs the extracted metadata to the server unit 204 to be stored and indexed as metadata 736.

On the other hand, if the decision unit 722 determines that the electronic file 710 is a duplicate, then the upload unit 726 creates a virtual document. A virtual document may be created by reusing data already stored. For example, if the electronic file 710 is an email received by person A from person B (e.g., an email in person A's inbox), it may be a duplicate of an email sent from person B to person A (e.g., an email in person B's sent items box). As such, the body of the emails and the static metadata may be the same, and thus reusable if the body and the static metadata have already been stored and indexed in the server units 202 and 204, respectively, for one of the duplicate emails (i.e., for the "original" email).

Thus, rather than creating new index information (e.g., indexed content and/or indexed static metadata in the server units 202 and 204, respectively) and a new converted file (e.g., a read-only file in the server unit 208), the upload unit 726 may create a virtual document that associates the duplicate electronic file with the previously stored and indexed data for the "original" file. Virtual documents may be implemented in any number of ways, such as an electronic file having a document number that is different than a document number of the "original" file, a link, or other data structure that points to or otherwise associates information with one another, for example.

In other embodiments, virtual documents may not be created at all. For example, in one embodiment if the decision unit 722 determines that the electronic file 710 is a duplicate, no data will be uploaded by the upload unit 726 into the database system 120 and a virtual document would not be created. The duplicate electronic file 710 may be discarded as one option. As another option, the duplicate electronic file 710 may be "obsoleted" or otherwise stored in such a manner that the duplicate electronic file is not accessible, searchable, shows in search results, and/or viewable by users of the terminals 114—just certain individuals (such as system administrators) may be given access rights to obsoleted documents, including permission to remove a document from obsoleted status.

In yet another embodiment, at least some of the content of identified duplicate files may be stored and/or indexed. For example, the textual content and/or the associated metadata of duplicate electronic files may be stored and indexed in the server units 202 and 204, respectively, and a new converted file (e.g., a read-only file in the server unit 208 may also be generated for the duplicate electronic file(s). The same or different server units may be used for the storing and indexing. Moreover, different versions (e.g., different versions of the same electronic file associated with an individual and/or duplicate electronic files from different persons, etc.) of the same electronic file may be stored and indexed if appropriate, rather than or in addition to using a virtual document that refers to the same source electronic file.

In an embodiment in which a virtual document is created, the upload unit 726 may direct dynamic metadata of the duplicate electronic file 710 to the server unit 204 for storage as indexed and searchable dynamic metadata 738. Recall that between duplicate electronic files, there may be some types of metadata that is different between them, such as metadata that indicates whether a duplicate email was in custodian A's inbox or in custodian B's sent items box. This dynamic metadata is stored in the server unit 204 (or other suitable storage location) as the metadata 738 that identifies the duplicate as belonging to custodian B (for example), so that a legal professional searching for emails in custodian B's sent items box will apply a query against the metadata 738—and the result will be a read-only document from the server unit 208 that corresponds to the applicable metadata 738 but which was "originally" stored in the server unit 208 as custodian A's received email. A virtual document 744 is symbolically shown in FIG. 7 as being returned by the engine 122 to a terminal 114 by way of the server 112 and server unit 206. The virtual document 744 is associated with its stored dynamic metadata 738, with the index data 734 of a prior ("original") electronic document 742, and with the read-only file 732 of the "original" electronic document 742.

In an embodiment and as part of the document review process performed by users at the terminal 114, bulk annotation may be initiated by way a suitable user interface, such as that shown in FIG. 4. Bulk annotation allows a user to apply a particular annotation (e.g., "responsive," "privileged," etc.) to a particular document that is being viewed on the user interface, and then the same annotation is applied at the back-end to all of the duplicate documents. In another embodiment, the user can apply annotations individually to each duplicate document and/or apply the annotations to subsets of duplicate documents. Alternatively or additionally, bulk annotations can be restricted based on particular users or based on some other business rule. For instance, if two attorneys are both reviewing documents pertaining to the same case, then the bulk annotations performed by the first attorney are applied to only the documents that the first attorney is reviewing and not to the documents that are being reviewed by the second attorney, and vice versa. Bulk annotations may be performed in one embodiment by pushing (e.g., clicking a mouse on) one more buttons of the user interface.

Still alternatively or additionally, bulk annotation may also be used to categorize groups of documents. For instance, a user (legal professional) may bulk annotate or otherwise bulk categorize conversation threads and their attachments as a group. In such embodiments, the bulk annotations may be applied to all copies of documents in the same group.

Figure 8:
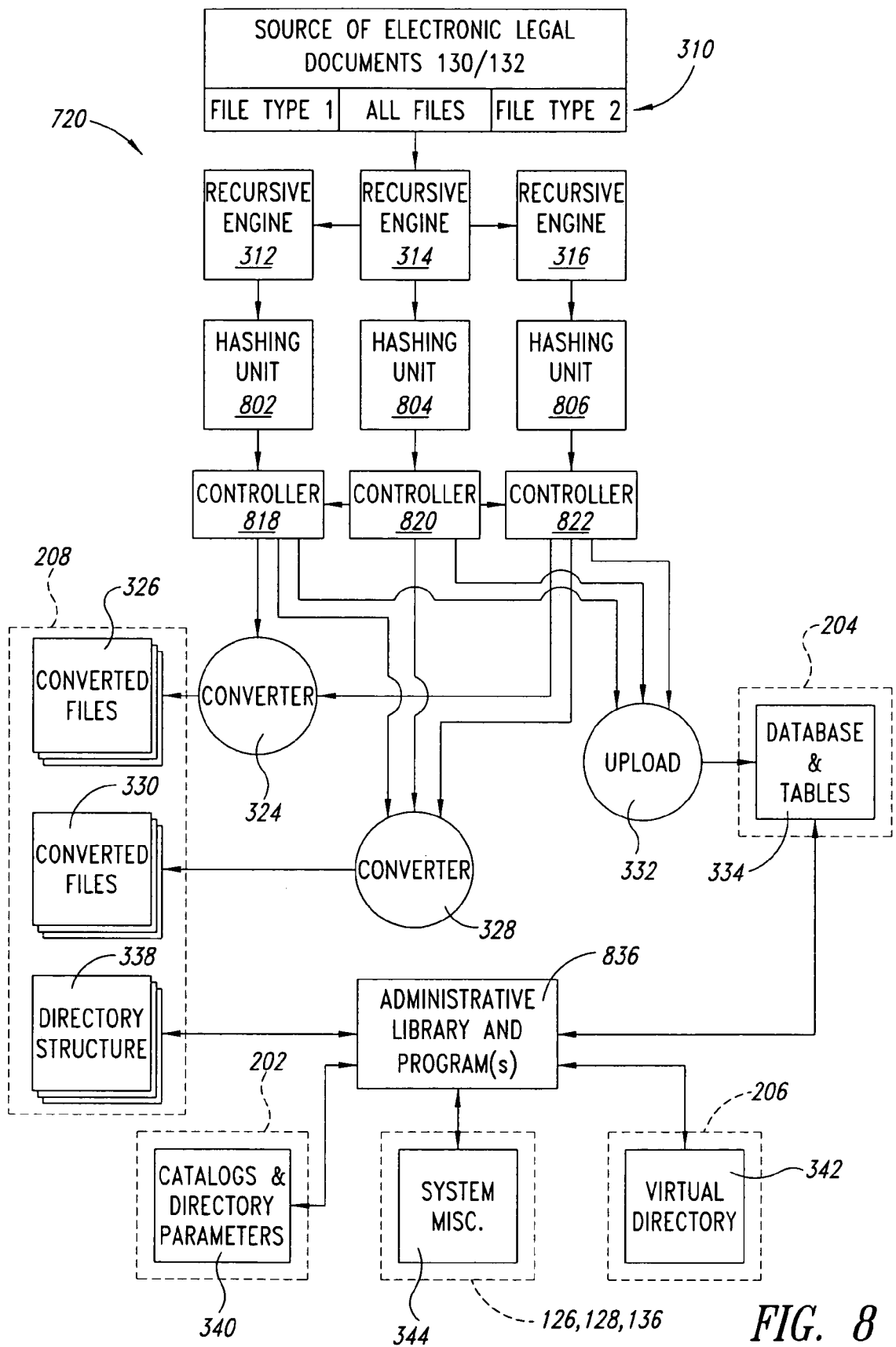
FIG. 8 is a flow diagram illustrating an example of a conversion method for loading electronic files having duplicative information.

Referring next to FIG. 8, an embodiment of parts of the conversion engine 720 is shown. Some aspects of the operation of the conversion engine 720 are similar to that of the conversion engine 134 of FIG. 3, and thus only aspects specific to the conversion engine 720 will be discussed herein for the sake of brevity.

The conversion engine 720 includes a plurality of recursive engines 312-316 to process the different electronic file types 310 that are received from the information system 130 and/or the storage media 132. The recursive engines 312-316 "recursively" go through every path in a directory structure (or other data structure) and extract the files in each path, while still preserving the directory structure from which the files are taken. Once the files (and their directory structure) have been extracted by the recursive engines 312-316, a plurality of hashing units 802-806 corresponding to the respective recursive engines 312-316 create a hash for each of the extracted files. For instance, the hashing unit 802 creates a hash of the files provided by the recursive engine 312. While three hashing units 802-806 are shown in FIG. 8, there can be any number hashing units used. For example, a single hashing unit may be used to create a hash of each of the files that the recursive engines 312-316 extract, rather than providing for separate multiple hashing units. Alternatively or additionally, hashing for a single electronic file may be performed by multiple hashing units (e.g., a first hashing unit hashes a first portion of the electronic file, while a second hashing unit hashes a second portion of the electronic file).

Once the file hashes have been created, controllers 818-822 may perform operations on the corresponding extracted files similar to that of the controllers 318-322. In addition, the controllers 818-822 of one embodiment can include the structure and functionality of the upload unit 726 and the decision unit 722, of FIG. 7 and may thus compare the respective hashes generated by the hashing units 802-806 with the hashes of other electronic files. That is, the decision unit element of the controller 818 (for example) compares the hash corresponding to hashing unit 802 to that of other files that were previously hashed. The decision unit elements of the controllers 818-822 use this comparison to determine whether the extracted files are duplicates, similar to the manner described above with reference to FIG. 7. Emails, attachments, application files, text, graphics, or any other type of electronic file or combination or portions thereof may be hashed and compared to determine the degree of duplication.

Converted files (e.g., read-only files) may be stored in the server unit 208 based on the controllers' 818-822 determination. If the extracted files are determined to contain duplicative information, a new file may not be stored in the server unit 208. Thus, if the files are determined to be duplicates by the controllers 818-822, the extracted files may not be sent to the converters 324, 328, and 332 and a converted file may not be stored in the server unit 208. On the other hand, if the extracted files are not duplicates, the extracted files may be sent to the converters 324, 328, and 332 to be converted to a read-only format and stored in the server unit 208.

Metadata may be stored in the server unit 204 without regard to whether the extracted files are duplicates. That is, both static and dynamic metadata may be directed to the server unit 204, with dynamic metadata being stored if an electronic file contains duplicative information. Metadata may be extracted by the controllers 818-822 and directed to the upload unit 332. The upload unit 332 stores this electronic characteristic information in databases and tables 334 or other suitable data structure in the server unit 204. Additional functions of the controllers 818-822 not discussed may also operate in a manner similar to that of the controllers 318-322.

Content of the extracted electronic files may be stored and indexed in the server unit 202 based on the controllers' 818-822 determination. That is, if the extracted electronic files are duplicates, the content of the duplicate electronic file need not be stored and indexed in the server unit 202. On the other hand, if the electronic files are not duplicates, the content of the electronic files may be stored and indexed in the server unit 202.

Thus, in one embodiment, when a duplicate document is identified, and a virtual document is created by linking to stored information associated with the "original" document rather than re-indexing data of the duplicate document, the virtual document may be searchable in a manner similar to that described in relation to FIG. 2 above. That is, when a user sends a search query from the terminal 114 to the server 112 through the server unit 206, the engine 122 applies the query to the contents of one or more of the server units 202, 204, and 208. In such embodiments, matching virtual document results (in the case where duplication is present) are returned by the server unit 206 in the form of a single document that represents both the "original" plus duplicates.

In other embodiments, duplicate documents are obsoleted, thereby making them unsearchable or otherwise inaccessible to users of the terminals 114. Obsoleting electronic documents may include storing (and possibly indexing) or otherwise maintaining the duplicate electronic documents (or portions thereof) in the server units 202, 204, and 208 (or other suitable storage location), but not allowing the stored electronic documents to be viewable, searchable, appear in search result—or otherwise restrict access to the stored electronic documents. Thus, when a user sends a search query from the terminal 114 to the server 112 through the server unit 206, the engine 122 applies the query to the contents any one or more of the server units 202, 204, and 208. In such embodiments, matching "original" documents may be returned, while matching obsoleted duplicate documents may not even appear in the search results or may be identified as inaccessible duplicate documents on a hit list. Obsoleting provides a more efficient environment for the reviewing attorneys, since such attorneys would not be presented with and therefore would not have to deal with duplicate documents.

In still other embodiments, duplicate documents may not be stored at all to begin with at the back-end. That is, when an electronic document is identified as a duplicate by the decision unit 722, no information need be uploaded into the server units 202, 204, and 208. Thus, when a user sends a search query from the terminal 114 to the server 112 through the server unit 206 and then the engine 122 applies the query to the contents of the server units 202, 204, and 208, matching results pertaining to only one stored copy of an electronic document are returned.

In still other embodiments, the controllers 818-822 and the hashing units 802-806 may operate to determine whether the storage media 132, as a whole, is a duplicate storage media. That is, a "media hash" may be generated and used to determine if a storage media is a duplicate of some other storage media that may have already been received and processed by the upload unit 134. For example, if the storage media is a compact disc, its contents may be ready to be extracted and indexed for the first time, or the compact disk may be a duplicate copy of another compact disc that has had its contents already extracted and indexed. There are numerous reasons why a duplicate compact disk or other storage media may be delivered to the upload unit 134. One reason is that the producing party may be providing backup copies of compact disks. Another reason is that the producing party may have lost track of which compact disks have already been provided.

A media hash is created by first creating each of the file hashes in the manner described above for all of the files on the media, and then the media hash is created based upon the individual file hashes. For example, in some embodiments the media hash may be a concatenation of the individual file hashes. On other embodiments the media hash may be another combination or arrangement of the individual file hashes or be another format of data based upon the individual file hashes. In short, a "hash of a hash" can be created.

Once the media hash has been created, the controllers 818-822 compare the newly created media hash to other media hashes previously created to determine whether the storage media 132 contains duplicative information. If a duplicate media hash is found, the controllers may deal with the duplicate media in an appropriate manner, such as by not uploading its contents or by uploading its contents and then obsoleting the contents. In this manner, many duplicate files can be prevented from being stored, processed, and subsequently reviewed by legal professionals.

In summary, embodiments of the invention provide a system and method where electronic legal documents, such as email messages, can be stored in a database system 120 such that the electronic characteristics associated with the native format of the electronic legal documents are substantially preserved. The electronic characteristics that are preserved include metadata, conversational threads, attachments, and other electronic document information. Once in the database system 120, the stored electronic legal documents are indexed and can be searched by users at terminals 114. The users at the terminals 114 are provided with access to the database system 120 via the server 112. The terminals 114 have user interfaces 400 to provide the users with a variety of searching, processing, and saving capabilities, including the ability to follow conversational threads, view attachments, index and retrieve relevant documents, etc.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, although embodiments of the invention are described herein as being useful in the context of discovery during litigation, other areas of the legal practice may benefit from the described embodiments. Mergers and acquisitions and due diligence efforts, for example, involve the expensive, cumbersome, and time-consuming activities of sorting, analyzing, and indexing voluminous amounts of documents in an effort to locate relevant information. Embodiments of the invention are thus well suited for processing electronic documents under these settings, and may be modified appropriately to be tailored to a particular application. For example, the user interfaces shown in FIGS. 4-6 have document processing boxes 450 that are tailored for litigation, but it is understood that such the document processing boxes 450 may be labeled for due diligence applications. Therefore, the embodiments of the invention are not limited by the specific format of the user interface 400.

Further, it is possible to provide embodiments where users can access the server 112 via a location remote from the terminals 114. For example, the server 112 may be accessed from the user's home via a dial-in modem, so that the user need not be present in the law office when performing document review. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method in a network for analyzing data produced for legal purposes, the method comprising:

receiving, from a source that is external to the network for analyzing data produced for legal purposes, a plurality of electronic files, including email of which some have duplicative information, that are arranged according to a directory structure, that are subject to a legal proceeding, and that are produced by at least one party involved in the legal proceeding;

at a first server unit in the network at a back-end, providing the received electronic files in a searchable format;

at a second server unit in the network at the back-end, providing metadata associated with the received electronic files while preserving directory structure information of the directory structure;

identifying duplicative electronic files that are duplicative of each other or that contain information that is at least partially duplicative of other electronic files; and under control of a network server at the back-end, receiving at the back-end a request for electronic files having a specified characteristic;

processing either or both the metadata in the second server unit and the electronic files in the searchable format to determine and communicate a set of electronic files having the specified characteristic that are responsive to the request, thereby facilitating processing of the determined set of electronic files for legal purposes; and first applying a legal annotation to a particular electronic file having the specified characteristic and that is responsive to the request, and then applying in bulk same said legal annotation to each of a group of identified duplicative electronic files stored at the back-end and that each contain information that is at least partially duplicative of information contained in said particular electronic file, to eliminate having to separately apply said legal annotation to each of the group of duplicative electronic files.

2. The method of claim 1 wherein providing the received electronic files in the searchable format includes indexing text content of the received electronic files.

3. The method of claim 1 wherein the legal proceeding is a discovery proceeding that is part of a lawsuit, a mergers and acquisitions proceeding, or a due diligence effort.

4. The method of claim 1 wherein receiving the plurality of electronic files that are subject to the legal proceeding, the electronic files produced by at least one party involved in the legal proceeding, comprises:

receiving, from the source that is external to the network for analyzing data for legal purposes, at least some emails that have been previously communicated between the at least one party and another party prior to the legal proceeding, the external source belonging to the at least one party of the legal proceeding and having these electronic files, wherein the plurality of electronic files are received at the network during the legal proceeding, the network not belonging to any party of the legal proceeding.

5. The method of claim 1 wherein providing the metadata associated with the received electronic files at the second server unit includes providing threading information associated with the emails.

6. The method of claim 1 wherein receiving the plurality of electronic files that are subject to the legal proceeding from the external source includes receiving an electronic calendar, electronic schedule, spreadsheet, word-processing file, application files arranged in the directory structure, textual data, or graphical data.

7. The method of claim 1 wherein at least some of the received emails have attachments, the method further comprising:

providing the emails in a read-only format in a third server unit and in the searchable format in the first server unit;

separately providing the attachments in a read-only format in the third server unit and in the searchable format in the first server unit; and providing metadata associated with the attachments in the second server unit.

8. The method of claim 1, further comprising providing a user interface to display said particular electronic file having the specified characteristic and that is responsive to the request, and wherein the user interface is adapted to apply said legal annotation to the electronic file having the specified characteristic and that is responsive to the request and further adapted to apply said bulk same said legal annotation to said group of electronic files that contain information that is duplicative of information contained in said particular electronic file.

9. The method of claim 8 wherein the legal annotations include at least one of reviewed, privileged, hot, responsive, or witness preparation annotations.

10. The method of claim 1, further comprising providing summary information indicative of electronic files that are available to be processed to determine the set of electronic files having the specified characteristic.

11. The method of claim 1 wherein receiving the request for electronic files having a specified characteristic includes receiving a request that specifies at least one of the following: a word in an electronic file, a sender of an email, a recipient of an email, a subject of an email, a date associated with an electronic file, properties information associated with the electronic file, an annotation to an electronic file, attachment information, a case identifier, or a collection name.

12. The method of claim 1, further comprising determining whether any of the received electronic files have duplicative information, and if determined to have duplicative information, associating such electronic files to existing electronic files that have their searchable format in the first server unit and read-only copies in a third server unit, without separately providing another searchable format and other read-only copies of the electronic files having duplicative information in the first and third server units, respectively.

13. A system to analyze data produced for legal purposes, including email that has been previously communicated over a network, the system comprising:
   at least a first recursive engine configured to receive over the network, from a source that is external to the system to analyze data produced for legal purposes, a plurality of electronic files that are subject to a legal proceeding and at least some of which have duplicative information, the electronic files produced by and belonging to at least one party involved in the legal proceeding and present on a medium, and to extract the plurality of electronic files from the medium and to identify duplicative electronic files that are duplicative of each other or that contain information that is at least partially duplicative of other electronic files;
   a network server that includes:
      a first server unit coupled to the first recursive engine configured to provide the received electronic files in a searchable format;
      a second server unit coupled to the first recursive engine configured to provide metadata associated with the received electronic files; and
      a second engine in communication with the first and second server units configured, when executed using instructions stored in a computer-readable medium, to receive a request communicated via the network for electronic files having a specified characteristic and to process either or both the metadata in the second server unit and the electronic files in the searchable format in the first server unit to determine a set of electronic files having the specified characteristic that are responsive to the request; and
      a user interface to present a particular electronic file from the determined set having the specified characteristic and that is responsive to the request, the user interface being adapted to first apply a legal annotation to the electronic file having the specified characteristic and that is responsive to the request and further adapted to then apply in bulk same said legal annotation to each of a group of identified duplicative electronic files stored at said server back-end and that each contain information that is at least partially duplicative of information contained in said particular electronic file to eliminate having to separately apply said legal annotation to each of the group of duplicative electronic files.

14. The system of claim 13, further comprising at least one application adapted to read a format of the received electronic files.

15. The system of claim 14 wherein the received electronic files include emails that have attachments, the system further including:
   at least one controller coupled to the first recursive engine to determine a server unit which to send the extracted electronic files; and
   a third server unit coupled to the controller to provide the emails in a displayable format and to separately provide the attachments in the displayable format, wherein the first server unit provides the attachment in a searchable format and wherein the second server unit provides metadata associated with the attachments and threading information associated with the emails.

16. The system of claim 14, further comprising a first administration program to generate a directory structure in the first server unit that indexes text data stored therein.

17. The system of claim 16, further comprising a second administration program to generate catalog and directory parameters that reference the directory structure in the first server unit and the text data therein.

18. The system of claim 14, further comprising at least one administration program to generate catalog and database parameters that reference the second server unit and the metadata therein.

19. The system of claim 14, further comprising another server unit, coupled between a client terminal and the second engine, to receive the request from the client terminal and to pass the request to the second engine to enable the second engine to apply the specified characteristic in the request to either or both the first and second server units, the second engine being configured to return responsive results of the request to the another server unit.

20. The system of claim 19 wherein the another server unit includes a virtual directory to reference data provided by the first and second server units.

21. The system of claim 14, further comprising:
   a user authentication unit communicatively coupled to the server to control access to the server;
   a user information unit communicatively coupled to the server to store information associated with users authenticated by and provided with access by the user authentication unit; and
   an administration unit to support services between the server and the user authentication and user information units.

22. The system of claim 21 wherein the server supports legal annotation tools on said user interface, said legal annotation tools being adapted to apply said legal annotation and other legal annotations.

23. The system of claim 14, further comprising:
   at least one hashing unit coupled to the first recursive engine to generate hashes for at least a portion of each of the extracted electronic files;
   a decision unit coupled to the hashing unit to compare the generated hashes, similar hashes being indicative of electronic files having duplicative information; and
   at least one controller coupled to the decision unit to process electronic files having duplicative information, as identified by said similar hashes, differently than other electronic files.

24. The system of claim 23 wherein the controller processes electronic files having duplicative information differently by maintaining restricted access to such electronic files.

25. The system of claim 23 wherein the controller processes electronic files having duplicative information differently by associating such electronic files to existing electronic files that have their searchable format in the first server unit and read-only copies in a third server unit, without separately providing a searchable format and read-only copies of the electronic files having duplicative information in the first and second server units, respectively.

26. The system of claim 23 wherein the hashing unit is further coupled to the first recursive engine to generate a media hash that is based at least in part on hashes generated for electronic files extracted from the medium, and wherein the decision unit is further coupled to compare generated media hashes to determine duplicate media.

* * * * *